(12) United States Patent
Stewart et al.

(10) Patent No.: US 9,612,707 B1
(45) Date of Patent: Apr. 4, 2017

(54) LENSES AND FILTERS FOR COMPLETE NETWORK PAGE CONTENT

(75) Inventors: Tony A. Stewart, Overland Park, KS (US); Francis C Rupert, Olathe, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 1911 days.

(21) Appl. No.: 12/559,229

(22) Filed: Sep. 14, 2009

(51) Int. Cl.
*G06F 3/0482* (2013.01)
*G06F 3/048* (2013.01)

(52) U.S. Cl.
CPC .................... *G06F 3/048* (2013.01)

(58) Field of Classification Search
USPC ........................................ 715/828
See application file for complete search history.

(56) References Cited

U.S. PATENT DOCUMENTS

| 2008/0222542 | A1* | 9/2008 | Woolf et al. ............... 715/764 |
| 2009/0037837 | A1* | 2/2009 | Raghunath et al. ........ 715/773 |
| 2010/0064247 | A1* | 3/2010 | Alford et al. ............. 715/781 |

OTHER PUBLICATIONS http://www.quackit.com/make-your-own-website/ accessed on Jul. 1, 2013.*

* cited by examiner

*Primary Examiner* — Angie Badawi

(57) ABSTRACT

Content lenses are used to manage the display of content in network documents. Lens content objects associated with a content lens are displayed upon activation of the content lens, allowing a user to control the amount of information provided in the network document. Content lenses are activated based on selection of a corresponding lens activation object. An activated content lens remains active as a user views additional network documents.

14 Claims, 13 Drawing Sheets

LENSES AND FILTERS FOR COMPLETE NETWORK PAGE CONTENT

BACKGROUND

Network documents such as web pages provide a convenient method for asynchronous communication. Placing content on a network site allows a user to access the content without further assistance from the author of the network document. This provides advantages for vendors, for example, as potential customers can obtain information at any time.

Unfortunately, there are limits to the amount of information that can be conveniently displayed at one time, due in part to limitations on the expected size of display screens for computing devices. As a result, only a portion of all available information can be offered to a user on the entry pages of a web site. Depending on the particular information a user is looking for, a user may have to serially select a number of links to find the desired information.

One way to increase the amount of information available is by using containers or portlets. A container is a portion of a web page that can include some information that can be viewed or hidden, depending on a user selection. Using containers, the amount of accessible information available on a web page can be increased. However, each container must be individually opened and closed, which can make it time-consuming to view multiple containers on a page.

Stacked series of menus provide another option for making content available on what appears to be a single page. When a stacked series of menus is used, each selection by a user can bring up another menu within the selected topic and/or additional information about the topic. Stacked menus can provide an interface to allow a user to target specific information at a web site. However, if the user makes an incorrect guess about where information is located within the stacked menus, the user may have to repeat the process of searching for information multiple times to find the correct branch of the menu tree.

SUMMARY

Embodiments of the invention are defined by the claims below, not this summary. A high-level overview of various aspects of the invention are provided here for that reason, to provide an overview of the disclosure, and to introduce a selection of concepts that are further described below in the detailed-description section below. This summary is not intended to identify key features or essential features of the claimed subject matter, nor is it intended to be used as an aid in isolation to determine the scope of the claimed subject matter.

In brief and at a high level, various aspects of this invention provide for the use of content lenses to manage the display of content in network documents. Lens content objects associated with a content lens are displayed upon activation of the content lens, allowing a user to control the amount of information provided in the network document. Content lenses are activated based on selection of a corresponding lens activation object. An activated content lens remains active as a user views additional network documents.

BRIEF DESCRIPTION OF THE SEVERAL VIEWS OF THE DRAWINGS

Illustrative embodiments of the present invention are described in detail below with reference to the attached drawing figures, and wherein.

DETAILED DESCRIPTION

Figure 1:
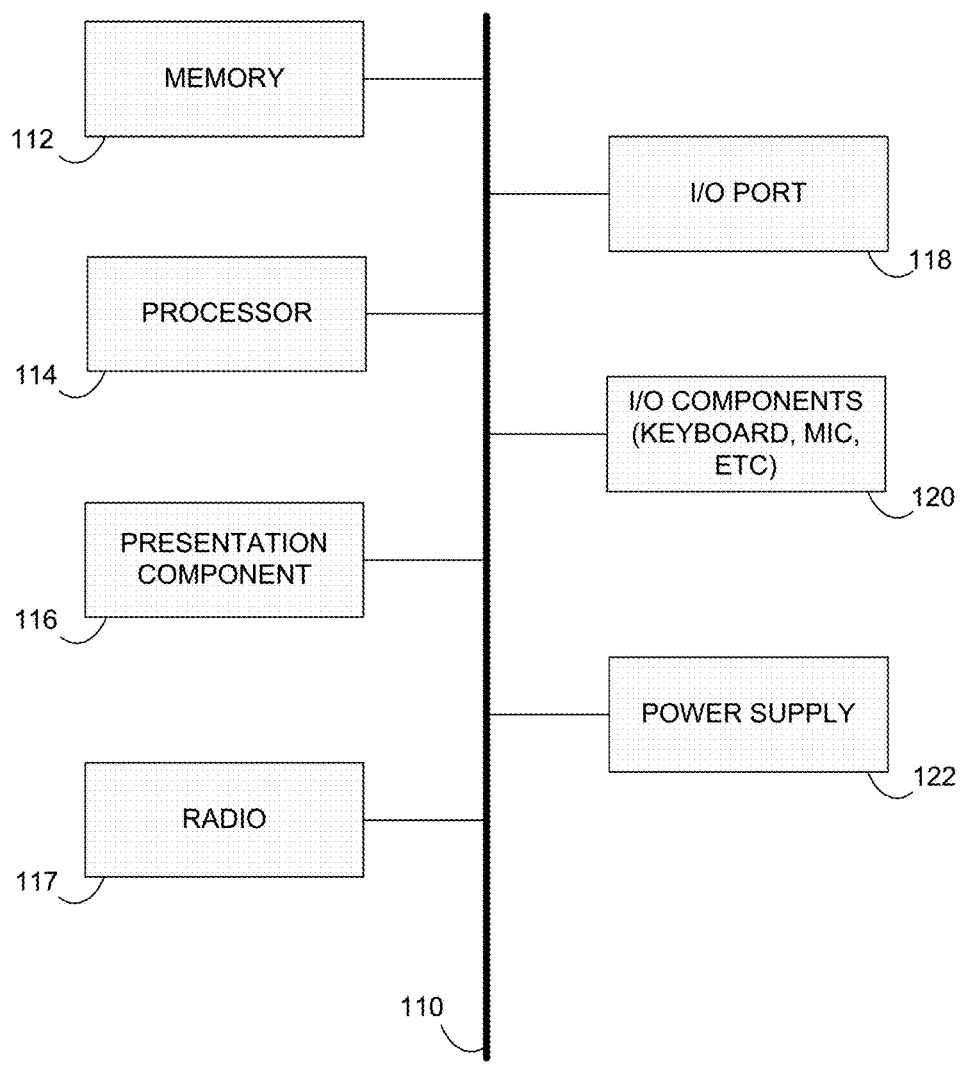
FIG. 1 schematically shows a computing device suitable for use in performing embodiments of the invention.

The subject matter of embodiments of the present invention is described with specificity herein to meet statutory requirements. But the description itself is not intended to necessarily limit the scope of claims. Rather, the claimed subject matter might be embodied in other ways to include different steps or combinations of steps similar to the ones described in this document, in conjunction with other present or future technologies. Terms should not be interpreted as implying any particular order among or between various steps herein disclosed unless and except when the order of individual steps is explicitly described.

Various technical terms are used throughout this description. An illustrative resource that fleshes out various aspects of these terms can be found in Newton's Telecom Dictionary by H. Newton, 24th Edition (2008).

Overview

In various embodiments, methods are described for providing content lenses for use in displaying information. A content lens is a group of content objects that can be activated for display at the same time. The group of objects is made visible when an appropriate lens activation object is selected. The activation is somewhat like using a "lens" that allows previously hidden content to by seen in the display screen.

A content lens allows the basic view of a web page to have a reduced amount of information, for ease of consumption by the user. If more information is desired, the user can select one or more lenses to add information to the page. In an embodiment, this can provide the advantage of allowing a user to open and/or display a related group of content objects with minimal activity. For example, rather than needing to individually open a "user comments" content object for each item on a page, a "user comments" lens can be activated to open all commentary related object available on a page at the same time.

In another embodiment, a content lens allows for improved context in providing additional information to a user. For example, when a user desires to find "help" information, a "help" lens can be used to show content objects on a page near the related page items, so that the context for each content object will be clear. This can avoid problems with providing generic help listings on a separate page.

In still another embodiment, a content lens can be persistent, meaning that the content lens remains active when a user moves between different locations within a web site. In such an embodiment, if a user has selected a "tutorial" lens on one page within a site, the "tutorial" lens will remain active on all other pages as well, until the user disables the lens. Thus, the user can selectively open multiple related content objects across a network site at the same time.

Lens Content and Lens Activation Objects

In various embodiments, the basic components of a content lens are a lens activation object and a plurality of associated lens content objects. A lens activation object is an object displayed in conjunction with a network document. In the discussion below, a network document refers to a document provided at a network site for viewing. The network document can be in any convenient form, such as an HTML document or another type of document that can be created for display as part of a network site. Preferably, a lens activation object can appear to be part of a network document, such as by being displayed along an edge of the document, or in a similar location across multiple documents in a network site. Alternatively, a lens activation object can appear in a browser viewing area for viewing a network document as an object that remains in the viewing area at all times. In some embodiments, a plurality of lens activation objects will be displayed together in conjunction with a network document.

A lens activation object can control the display or removal of lens content objects that are associated with a content lens. When a lens activation object is activated, such as due to selection by a user, all lens content objects associated with the corresponding content lens can be made visible in the network document. Preferably, a lens activation object can be displayed in conjunction with multiple network documents on a network site. In such embodiments, when a content lens is activated, the lens remains activated as other network documents from the site are visited. As a result, if a second network document within the network site is viewed while the content lens is activated, any lens content objects in the second network document that are associated with the content lens will also be displayed.

As noted above, a lens content object is associated with at least one content lens, and therefore with at least one lens activation object. In some embodiments, each lens content object is associated with only one lens activation object. A lens content object can be associated with a lens activation object in any convenient manner. For example, the association can be indicated in the lens content object as a metadata field. In such an example, when a lens activation object is selected or otherwise activated, the lens content objects having a metadata field corresponding to the content lens are identified, and the content for the associated lens content objects is displayed as part of the document.

In an embodiment, the information in a lens content object is determined when the associated content lens is activated. Preferably, the information in a lens content object is selected based on the value of at least one site state variable at the time of activation. A site state variable refers to a variable containing information about the current state of the document viewing session of a user. The site state variables can have any convenient type of value, including Boolean values, numeric values, or text values. The site state variables can represent various information. For example, some site state variables can represent information about documents within the network site that have been recently viewed. Other site state variables can be user state variables that provide information about the user currently viewing a document. User state variables can be of particular value in embodiments where a user is authenticated prior to viewing documents within a network site. In such embodiments, user state variables can be stored and accessed when a user provides appropriate authentication of an identity. Authentication can be accomplished by any convenient method, such as by use of a username and password as login fields.

Upon activation of a lens activation object, an associated lens content object can retrieve information for display, preferably based on the value of at least one site state variable. For example, if two site state variables are related to the content for a lens content object, a two-dimensional matrix can be used to indicate the proper information to retrieve based on the values of the site state variables.

As an example, a authenticated user can be viewing a document related to the user's cell phone account. Part of the document being used is a portion showing the user's current phone bill. The user then activates a "contact us" lens activation object. A lens content object exists for "contact us" related to display of the phone bill. The information in the content object is dependent on a user state variable for "payment due". If the user has not paid the most recent bill, the lens content object associated with the "contact us" activation object can show information related to payment addresses, addresses for disputing an item in the bill, and/or phone numbers for paying the bill by phone. If the "payment due" variable is false, due to the user having paid the most recent bill, the lens content object can instead show phone numbers for modifying the features of the phone service plan.

In various embodiments, the information in a lens content object can be dependent on any number of site state variables, including the possibility that some site state variables will not be dependent on a site state variable. In other embodiments, the information in each lens content object will be dependent on at least one site state variable. The site state variables referred to by each lens content object can be the same or different for each content object.

In another embodiment, a lens content object can retrieve information for display from the same location upon activation of a lens activation object. In such embodiments, the information for a lens content object is retrieved upon activation, but any changes in the information displayed will be due to updates to the database or other data structure being accessed to populate the lens content object.

Display of Lens Content Objects in Documents

In an embodiment, a lens content object can be displayed by integrating the lens content object into the display of the network document being viewed. For example, a network document can have one or more areas of primary display content. The primary display content represents content that is displayed when no lenses are activated. Each lens content object corresponds to one of the areas of primary display content. Note that more than one lens content object can be associated with an area of primary display content. Preferably, when multiple lens content objects are associated with an area of primary display content, each lens content object is associated with a different lens. In various embodiments, some areas of primary display content may have no corresponding lens content objects.

When a lens is activated, the associated lens content objects are displayed in, near, or otherwise in conjunction with the corresponding area of primary display content. This can be handled in any convenient manner. For example, consider a document with three vertical areas of primary display content. When a lens content object is displayed that corresponds to one of the areas, the lens content object can be displayed at the top of the area, the bottom of the area, or somewhere else within the area. The primary display content can be moved to accommodate display of the lens content object. Alternatively, space can be added between the vertical display areas, and the lens content object can be displayed in the space adjacent to the corresponding vertical area. In an embodiment where more than one lens is activated, all lens content objects corresponding to an area of primary display content can be displayed accordingly. In still another embodiment, the areas of primary content display can be initially arranged to allow for display of any lens content objects, event though the lens content objects are initially hidden. In such embodiments, the lens content object can be displayed in the available areas, without modification of other portions of the document. Of course, a combination of available areas and modifications of a document can also be used.

When a lens is deactivated, associated lens content objects are removed from the display. If the document was modified to allow display of a lens content object, the modifications can be reversed. Alternatively, once the document is modified, the space created for display of the lens content object can be maintained.

The lens content objects associated with a lens can include any type of information that is convenient. Thus, the content of a lens content object can be text, images, video, links to other network documents or applications, or any other type of content typically available via a network document. Similarly, the areas of primary display content in a network document can include any of the above types of content.

EXAMPLES

As an example, consider a network site that includes multiple documents. Such an example could be based on the network site for a vendor of consumer products or services. The site can be capable of allowing a customer to login and view various documents. The available documents can include documents related to the customer's current bill; documents related to the products and/or services currently used by the customer; documents related to ordering new products and/or services; or other documents that are useful for the vendor to provide to the customer via a network. For documents on the network site, the vendor can create the documents to include a number of content lenses. In this example, four content lenses will be described. The four content lenses in this example are a "help" lens, a "community comment" lens, a "tutorial" lens, and a "how to contact us" lens.

When a user visits the network site of the vendor, some or all of the documents on the site can be created to include the content lenses. For each document that includes the content lenses, lens content objects can be associated with the information in the document. These lens content objects are associated with one of the four content lenses, such as by including a metadata tag in the lens content object. The lens content objects preferably remain hidden from view until a user selects a lens activation object corresponding to the content lens.

When documents using content lenses are displayed for the user, a lens activation object corresponding to each content lens will be included in the display. Thus, each document provided by the vendor that uses content lenses will include a lens activation object for the "help", "community comment", "tutorial", and "how to contact us" lenses. When a lens activation object is selected, the document currently being viewed can be modified to display the lens content objects associated with the selected (or activated) lens activation object.

The content lenses can allow a large amount of information to be readily available to the user while reducing the amount of displayed information. The content lenses can also include different densities of information. For example, the "help" content lens can provide a lens content object for each content display area in each document. By contrast, the "how to contact us" lens may only include a few content display objects for each document, as there may not be a need to repeat the same contact phone numbers in a single document.

The "tutorial" content lens allows a large amount of information, in the form of tutorial walkthroughs, to be readily available to the user at the user's discretion. Such a lens can provide a variety of functions. When a user first logs in, the "tutorial" content lens can be activated, so that a user immediately has available the tutorial information regarding the content lenses. Once the user is familiar with the content lenses, the "tutorial" lens can be deactivated until the user has specific need for help with a new area of the network site. This allows for customized use of tutorials, as opposed to merely providing the tutorials when a user first uses a document, or always providing the tutorials and thereby cluttering the document view. Providing the "community comments" as a content lens also allows for customization. Users who do not wish to see community contents can leave the content lens inactive, or only activate the lens when they are ready to buy a new product or service.

Further examples of the invention are provided by the drawings, as described in more detail below. Embodiments of the present invention may be embodied as, among other things: a method, system, or set of instructions embodied on one or more computer-readable media. Computer-readable media include both volatile and nonvolatile media, removable and nonremovable media, and contemplates media readable by a database, a switch, and various other network devices. By way of example, and not limitation, computer-readable media comprise media implemented in any method or technology for storing information. Examples of stored information include computer-useable instructions, data structures, program modules, and other data representations. Media examples include, but are not limited to information-delivery media, RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data momentarily, temporarily, or permanently. In another embodiment, the computer-readable media can comprise tangible computer-readable media.

Turning now to FIG. 1, a block diagram of an illustrative computing device is provided and referenced generally by the numeral 100. The illustrative device may be a mobile device, or a laptop or desktop computer, or another computing device. Although some components are shown in the singular, they may be plural. For example, computing device 100 might include multiple processors or multiple radios, etc. As illustratively shown, computing device 100 includes a bus 110 that directly or indirectly couples various components together including memory 112, a processor 114, a presentation component 116, a radio 117, input/output ports 118, input/output components 120, and a power supply 122.

Memory 112 might take the form of one or more of the aforementioned media. Thus, we will not elaborate more here, only to say that memory component 112 can include any type of medium that is capable of storing information in a manner readable by a computing device. Processor 114 might actually be multiple processors that receive instructions and process them accordingly. Presentation component 116 includes the likes of a display, a speaker, as well as other components that can present information (such as a lamp (LED), or even lighted keyboards).

Radio 117 represents a radio that facilitates communication with a wireless telecommunications network. Illustrative wireless telecommunications technologies include CDMA, GPRS, TDMA, GSM, and the like. In some embodiments, radio 117 might also facilitate other types of wireless communications including Wi-Fi communications and GIS communications.

Input/output port 118 might take on a variety of forms. Illustrative input/output ports include a USB jack, stereo jack, infrared port, proprietary communications ports, and the like. Input/output components 120 include items such as keyboards, microphones, touch screens, and any other item usable to directly or indirectly input data into mobile device 110. Power supply 122 includes items such as batteries, fuel cells, or any other component that can act as a power source to power mobile device 110.

Figure 2:
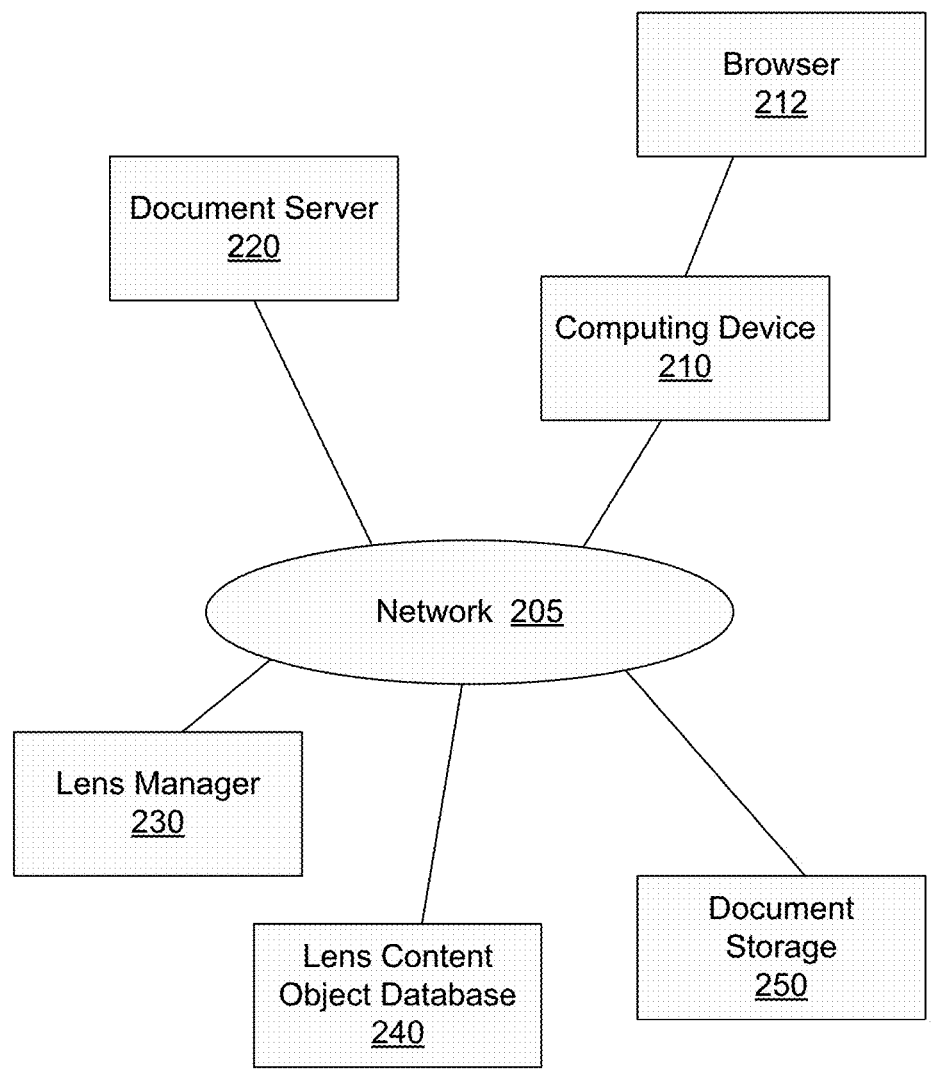
FIG. 2 schematically shows a system suitable for performing an embodiment of the invention.

FIG. 2 schematically shows an example of a computing environment suitable for performing various embodiments of the invention. In FIG. 2, a network 205 is shown as providing connectivity between various components. Network 205 can be a local area network, a wide area network (such as the Internet), or another suitable type of network for allowing communication between computing devices. Although various components are shown as being connected by network 205, in an alternative embodiment some components may be located at a single site, or may even be components that are part of a single computing device.

Computing device 210 represents a computing device that a user can employ to access a network document. Computing device 210 includes a browser 212, or another functionality for viewing a document provided over a network. Document server 220 can be a suitable processor for identifying a document requested over the network, and providing that document for viewing to a user. The document can be provided from document storage 250. Both document server 220 and document storage 250 can be part of the same computing device, or one or both can represent multiple computing devices that perform these tasks. Lens manager 230 represents an application that handles the tasks necessary to display and hide lens content objects when a lens is activated. Optionally, lens manager 230 could be part of document server 220. When a lens is activated, lens manager 230 can identify the lens content objects in a document that are associated with the lens, retrieve the information for the lens content objects (optionally based on the determined value of one or more site state variables), and provide the information to the document server for display. Any modification of documents that is needed to display a lens content object can be handled by the document server, the lens manager, or any other application involved in the display of the document, depending on the details of a given embodiment. Lens content object database 240 provides the information that is retrieved for the various lens content objects when a lens is activated. Optionally, lens content object database 240 can be part of document storage 250.

FIGS. 3 to 6 and 10 to 13 provide examples of displaying documents according to various embodiments of the invention. FIGS. 10 to 13 schematically show display of a document, but with a focus on just the "Lens" related items in the documents. The simplified view and description for FIGS. 10 to 13 is provided to facilitate understanding of display of a document according to an embodiment of the invention. FIGS. 3 to 6 provide a more detailed schematic showing of display of another document according to an embodiment of the invention.

Figure 10:
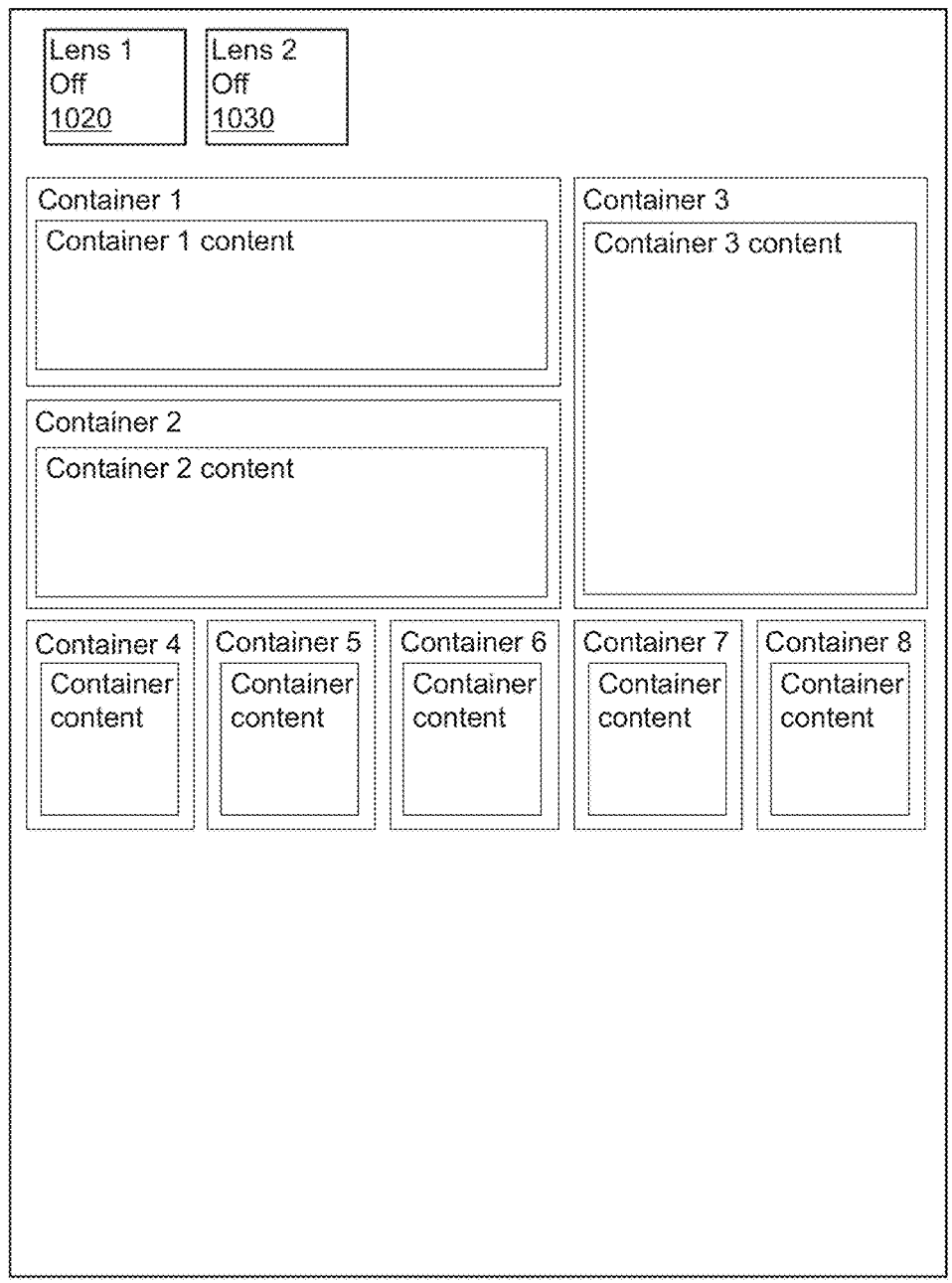
FIGS. 10 to 13 provide an alternative example of displaying a document according to an embodiment of the invention.

FIG. 10 schematically shows a simplified view of a document according to an embodiment of the invention. The document includes lens activation objects 1020 and 1030. Lens activation object 1020 corresponds to a lens referred to as "Lens 1" while lens activation object 1030 corresponds to a lens referred to as "Lens 2". As shown in FIG. 10, Lens 1 and Lens 2 are currently in the "Off" state. FIG. 10 also shows various containers that include various container contents. These containers can correspond to areas of primary display content.

Figure 11:
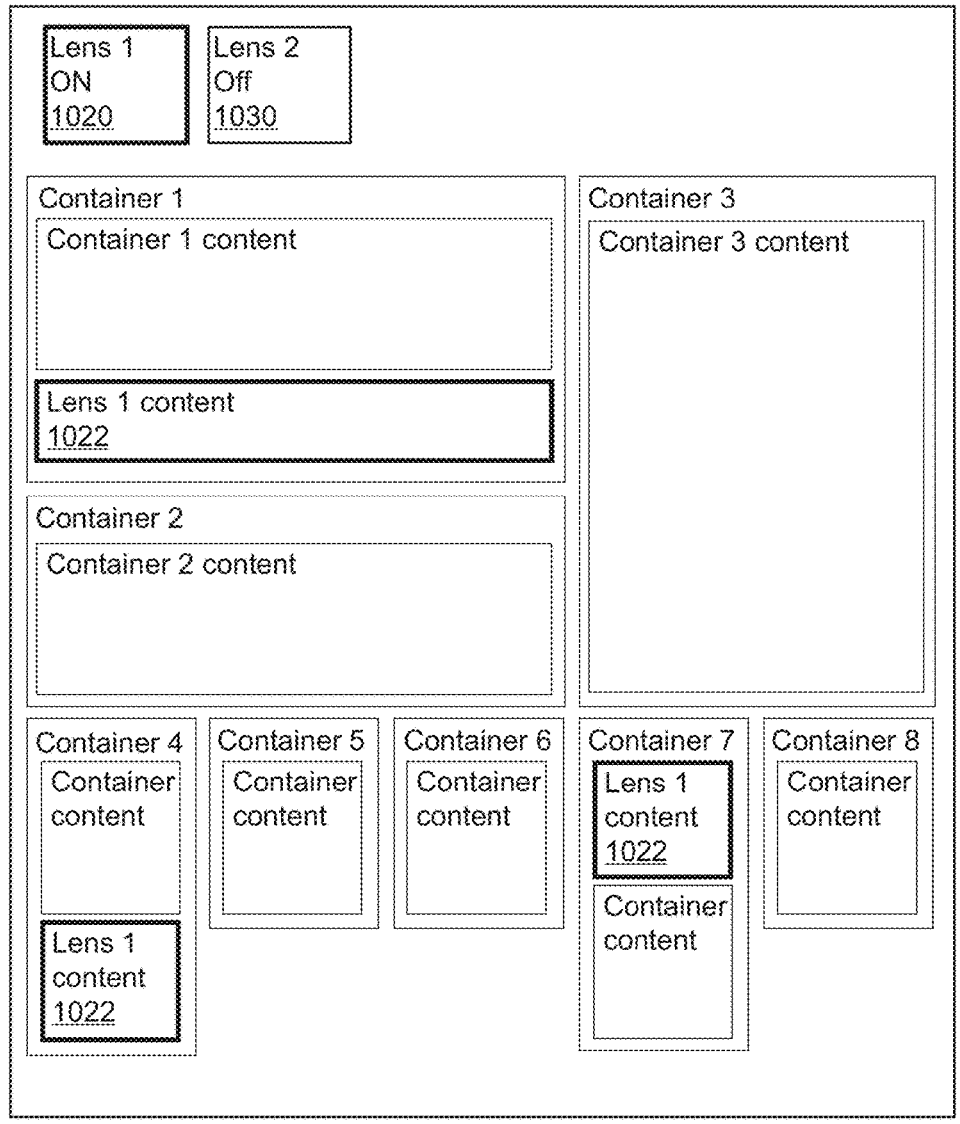

FIG. 11 shows an example of the document from FIG. 10 with lens activation object 1020 (Lens 1) switched to the "On" state. Lens activation object 1020 could be switched or activated into the "On" state by any convenient method, such as by performing a mouse click on or near the object, or by using one or more key strokes from a keyboard. In the embodiment shown in FIG. 11, activation of Lens 1 results in the display of three Lens 1 content objects 1022. As shown in FIG. 11, each of the Lens 1 content objects 1022 is associated with a different container. The Lens 1 content objects 1022 are displayed in various positions relative to the existing container contents. FIG. 11 shows a preferred embodiment of the invention, where display of a lens content object 1022 does not obscure or replace display of the existing container content. Instead, in the embodiment shown in FIG. 11, display of some of the Lens 1 content objects 1022 results in moving of one or more containers and/or container contents.

Figure 12:
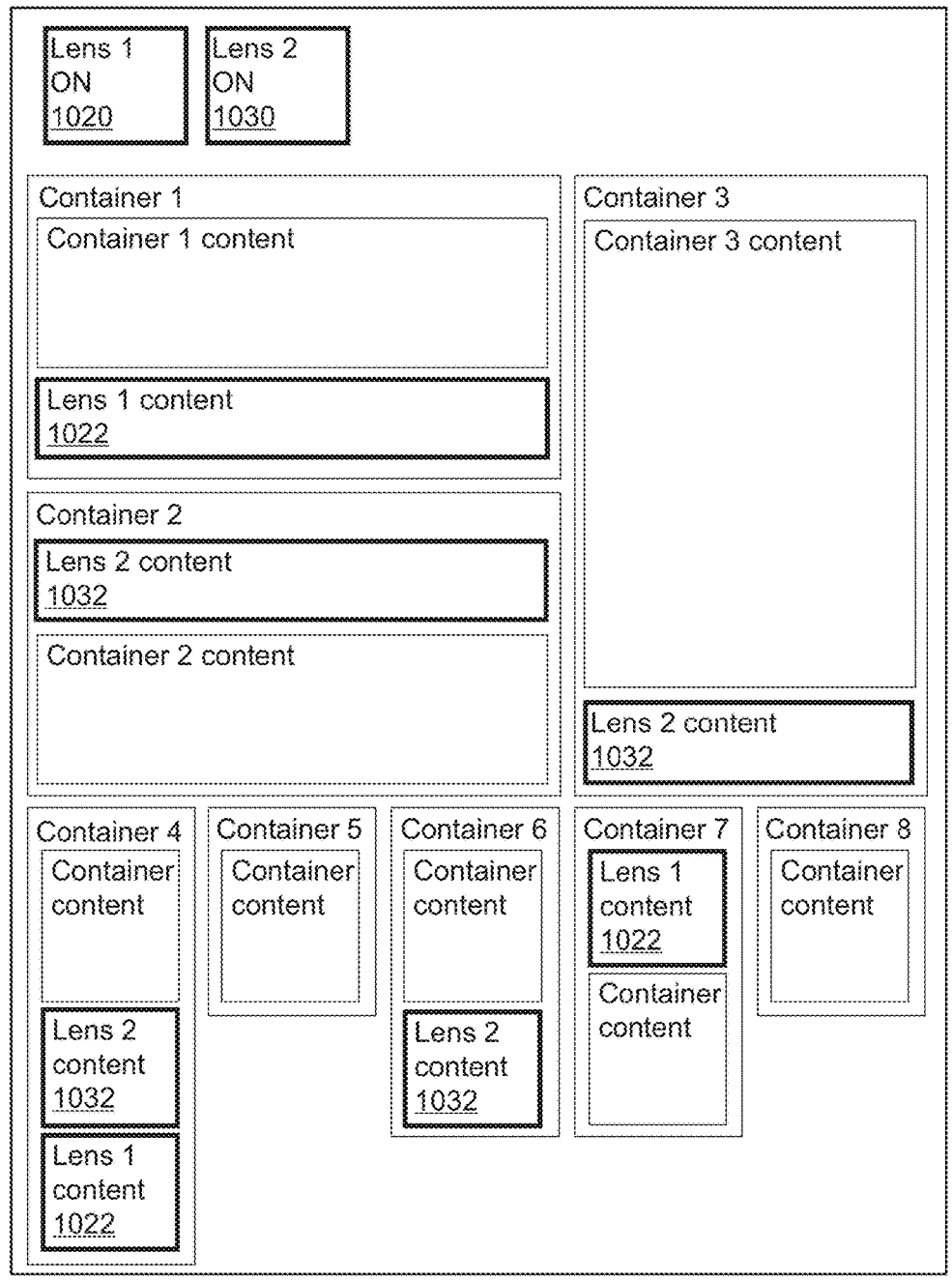

FIG. 12 shows an example of the same document, but with both lens activation object 1020 (Lens 1) and lens activation object 1030 (Lens 2) in the "On" state. This results in display of both Lens 1 content objects 1022 and Lens 2 content objects 1032. As shown in FIG. 12, a Lens 1 content object 1022 can be associated with the same container as a Lens 2 content object 1032. Once again, the existing containers and/or container objects can be moved to accommodate display of the Lens 1 content objects 1022 and Lens 2 content objects 1032.

Figure 13:
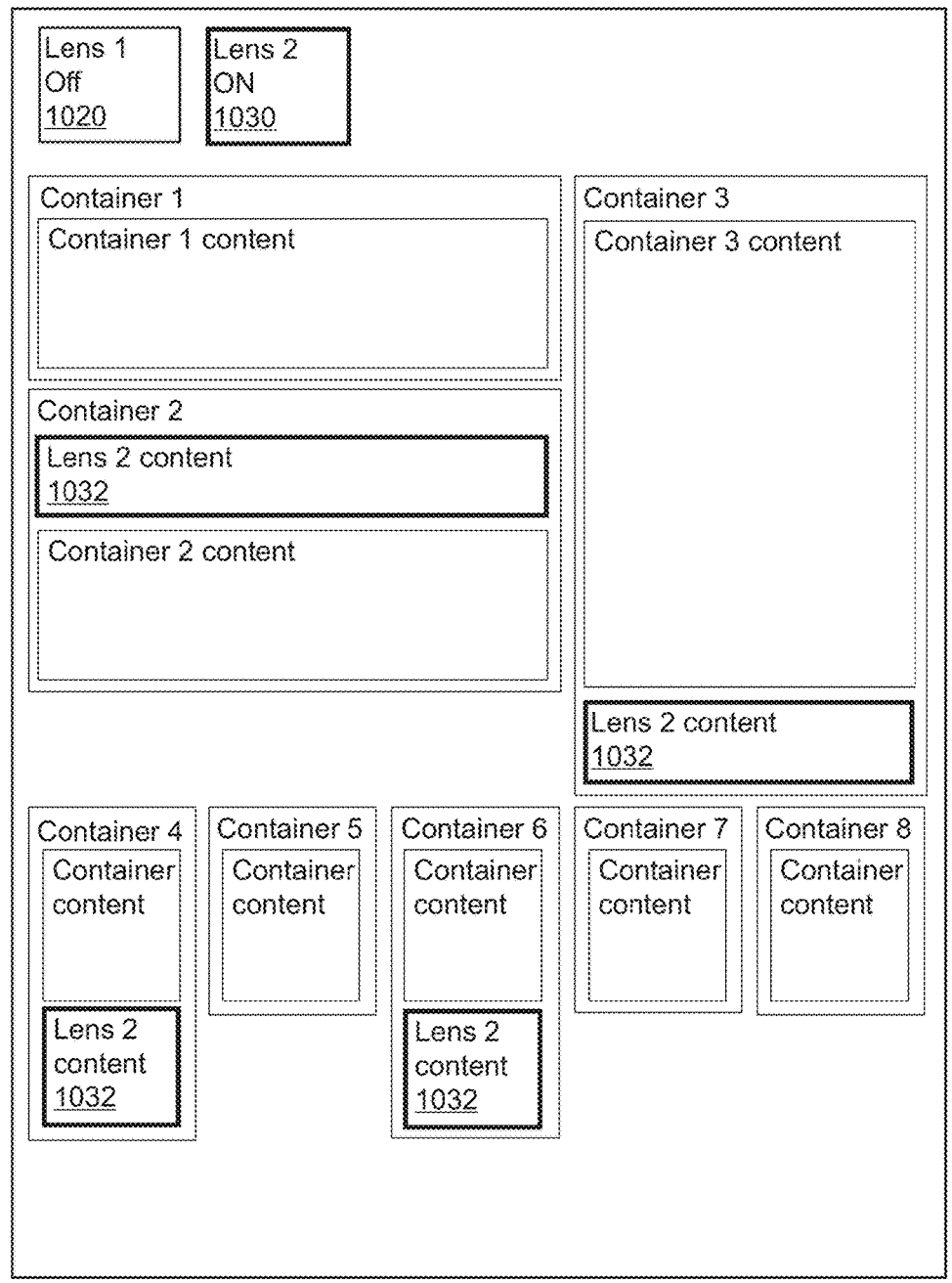

FIG. 13 shows yet another example of the document shown in FIGS. 10 to 12. In FIG. 13, Lens 1 activation object 1020 is in the "Off" state while Lens 2 activation object 1030 is in the "On" state. FIG. 13 indicates the display location of the Lens 2 content objects 1032 in relation to the containers and/or container objects.

Figure 3:
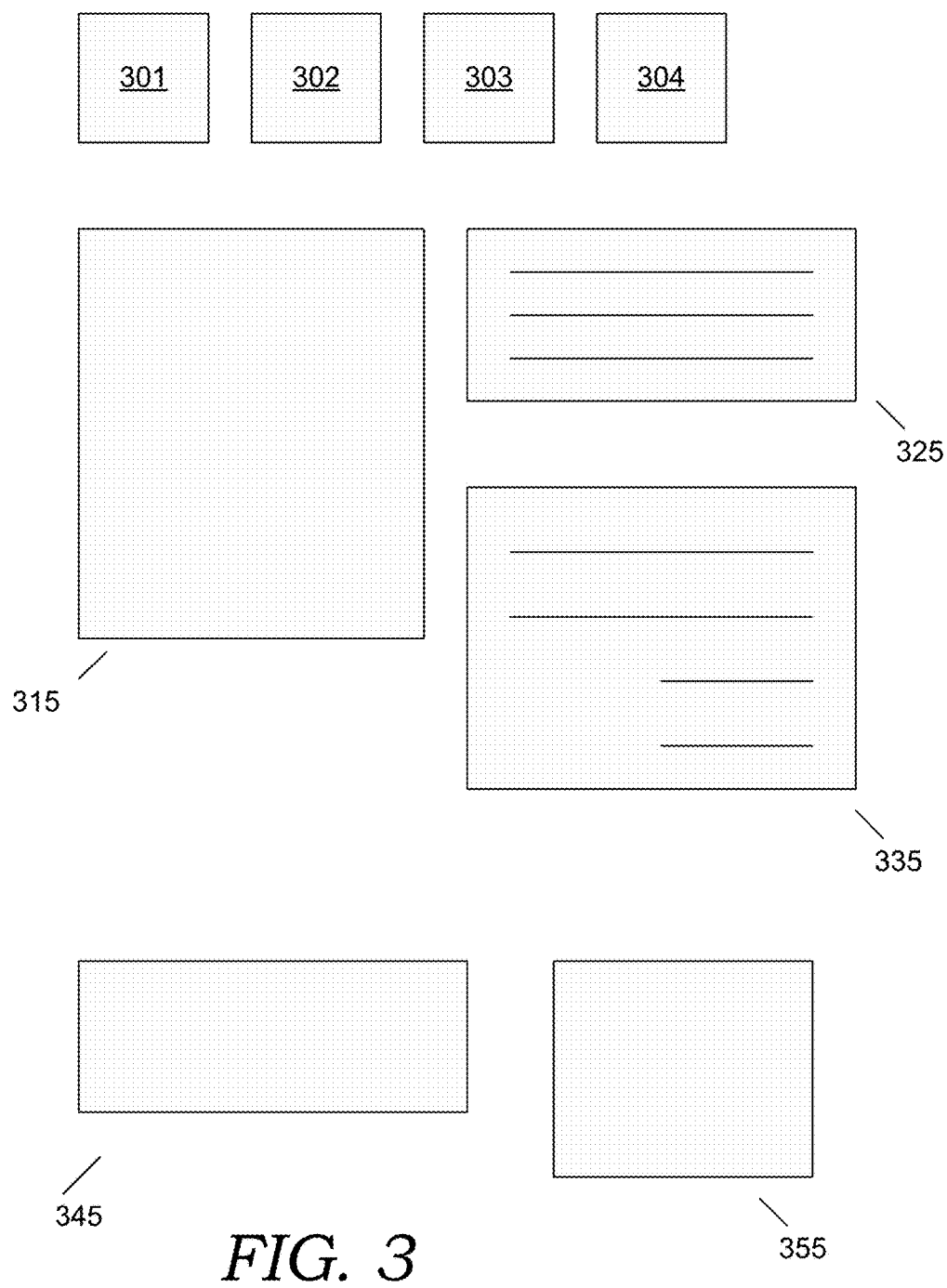
FIGS. 3 to 6 provide examples of displaying a document according to an embodiment of the invention.

FIG. 3 schematically shows another example of displaying a document according to an embodiment of the invention. Across the top of the document are lens activation objects 301 to 304. Each lens activation object represents a different lens that potentially can be activated. For example, in an embodiment where a document is being provided by a vendor to a customer (or other user) as part of a vendor network site, the four lens activation objects shown in FIG. 3 could correspond to lenses for "help" (302), "community comment" (303), "tutorial" (301), and "how to contact us" (304). In the embodiment depicted in FIG. 3, none of the lens activation objects are in the activated state. In other embodiments, any convenient number of lens activation objects can be available, and therefore any convenient number of lenses may be applied to a document. Preferably, two or more lenses are available for a document.

Areas 315, 325, 335, 345, and 355 represent various areas of primary display content. As noted above, the areas of primary display content can include any desired type of content. For purposes of illustration, lines are included in areas 325 and 335 to represent the existing content. However, it should be understood that any amount and type of content may be included in each area. The size and number of areas for primary content display are for illustration and are not meant to be limiting.

Figure 4:
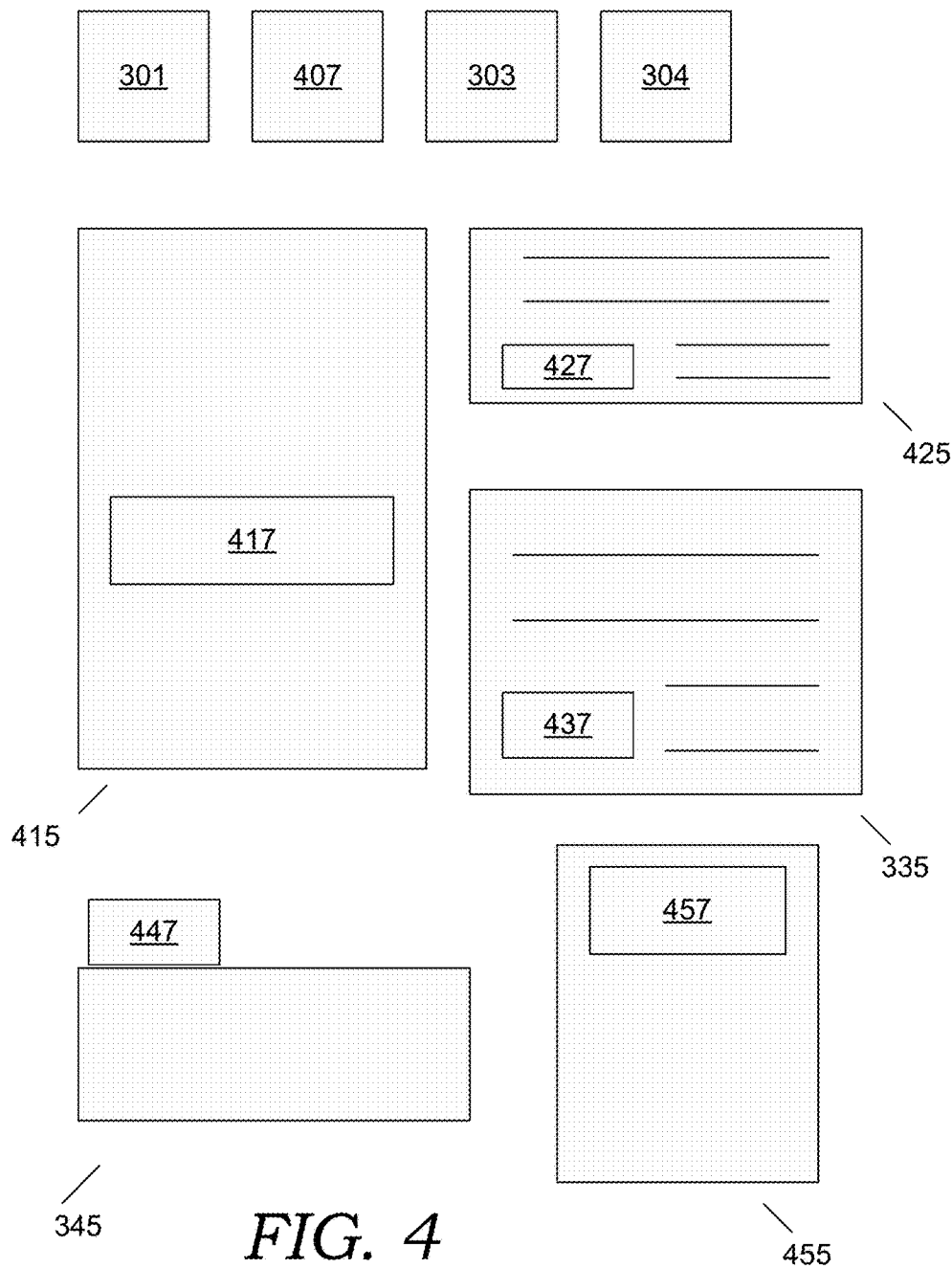

FIG. 4 schematically shows the document from FIG. 3 after activation of the lens associated with lens activation object 302. The activated state of the object is shown by the new numeral indication 407. As shown in FIG. 4, activation of the lens results in several modifications of the document. Original area 315 for primary content display has been expanded into area 415, so that a lens content object 417 can be included in the middle of the area. In original area 325, the size of the area has remained the same, but the content within has been rearranged as shown in area 425. Modifying the arrangement of the content allows lens content object 427 to be displayed within area 425. Original area 335 is unchanged, as the original format of area 335 allows for insertion of lens content object 337 without changing the size of the area or modifying the format of the primary content display in area 335. Area 345 is also unchanged. Instead of displaying lens content object 447 within area 345, the lens content object 447 is displayed adjacent to the area 345, in space that was not used in the original document. Finally, area 355 has been expanded to area 455, to accommodate placement of lens content object 457 at the top of area 455. Note that in the embodiment shown in FIG. 4, all of the primary display content shown in areas 315, 325, 335, 345, and 355 is still displayed in areas 415, 425, 335, 345, and 455. However, depending on the nature of how the lens content objects were placed, the primary display content can be moved and/or formatted differently, as was previously shown in the example related to FIGS. 10 to 13.

Figure 5:
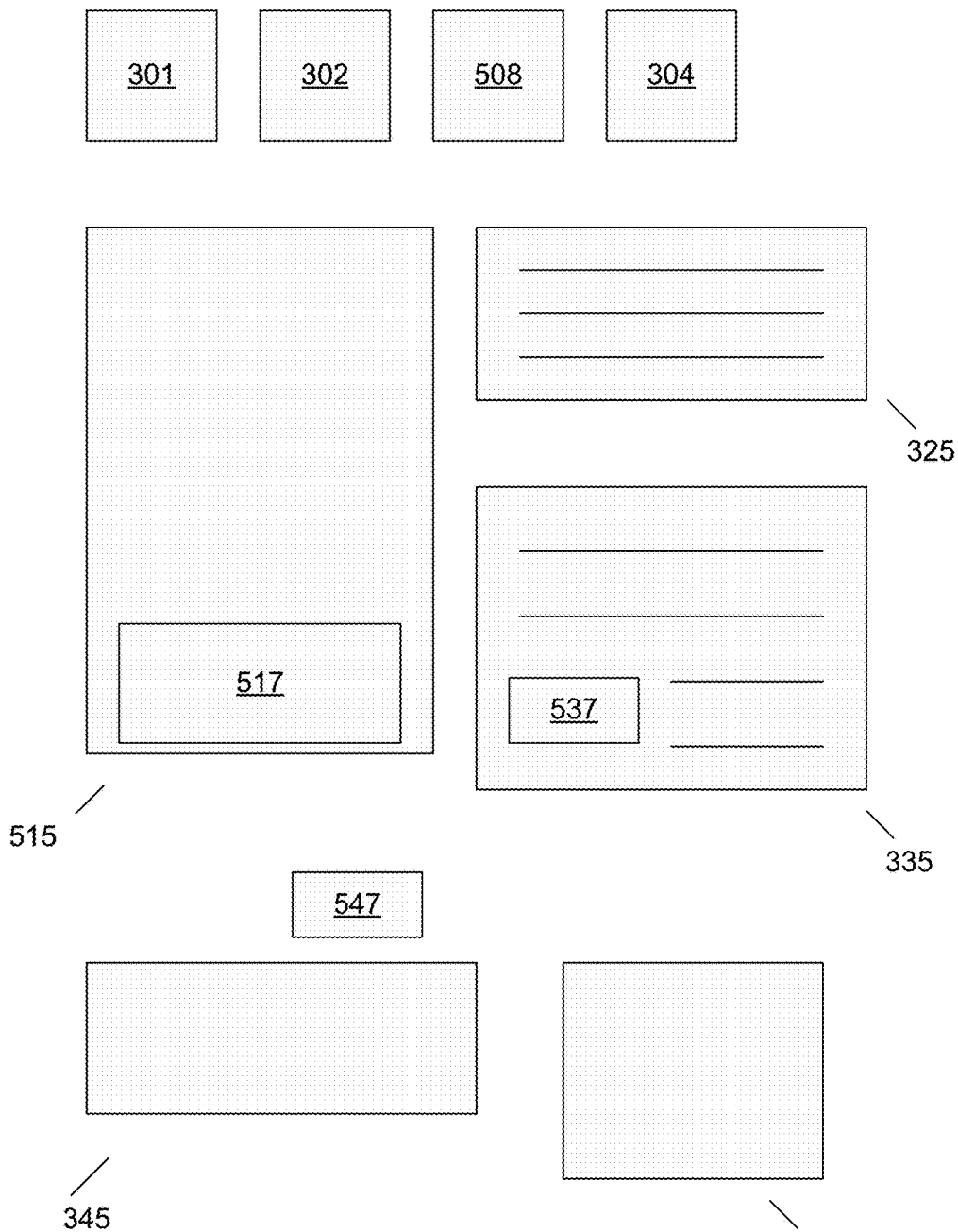

FIG. 5 shows the document of FIG. 3, but this time with lens corresponding to lens activation object 303 activated. The activated state of the object is shown by the new numeral indication 508. In FIG. 5, not all of the areas of primary content display have a lens content object corresponding to the area. Instead, there are only three lens content objects associated with the activated lens. Original area 315 has been expanded to area 515 to allow lens content object 517 to be displayed at the bottom of the area. Note that lens content object 517 is not displayed in the same location as lens content object 417. In FIG. 4, lens content object 417 was displayed toward the middle of area 415, while lens content object 517 is displayed toward the bottom of area 515. Area 325 is unchanged relative to FIG. 3, as the activated lens does not have a lens content object corresponding to this area, and this area does not need to be modified and/or moved to accommodate display of a lens content object corresponding to another area. As in FIG. 4, lens content object 537 is displayed in the space available within primary content display area 335. Lens content object 547 is displayed adjacent to display area 345, which also remains unchanged. Finally, display area 355 is unchanged, and there is not a corresponding lens content object.

Figure 6:
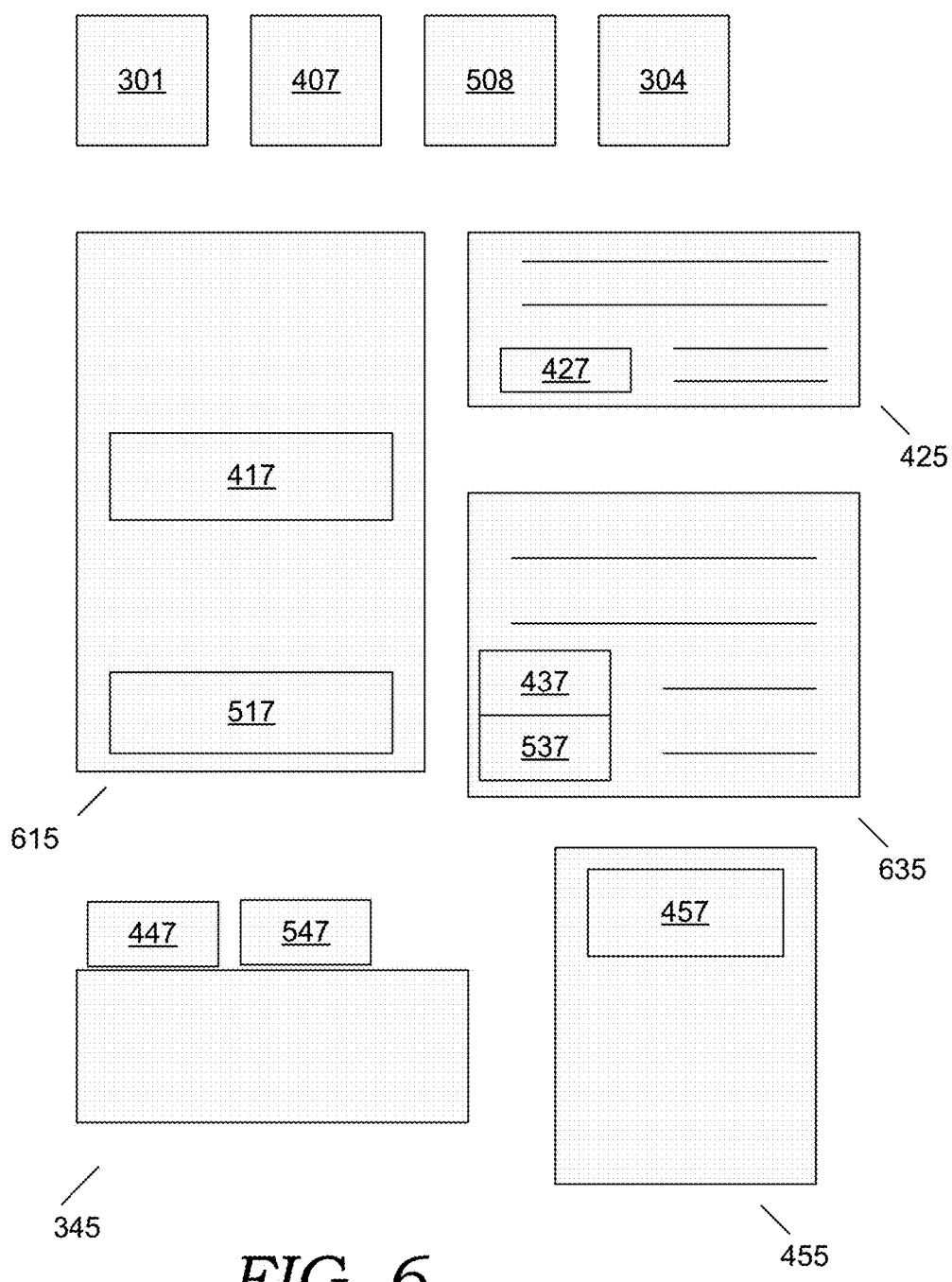

FIG. 6 also shows the document from FIG. 3, but this time both of the lenses activated in FIGS. 4 and 5 are activated at the same time. Area 615 now includes lens content objects 417 and 517. Area 425 and lens content object 427 appear as they did in FIG. 4. Lens content objects 437 and 537 are both displayed in the available space in area 335. Lens content objects 447 and 547 area both displayed adjacent to area 345. Finally, area 455 and lens content object 457 appear as they did in FIG. 4. As demonstrated in the embodiment shown in this figure, any combination of lenses may be activated at the same time.

Figure 7:
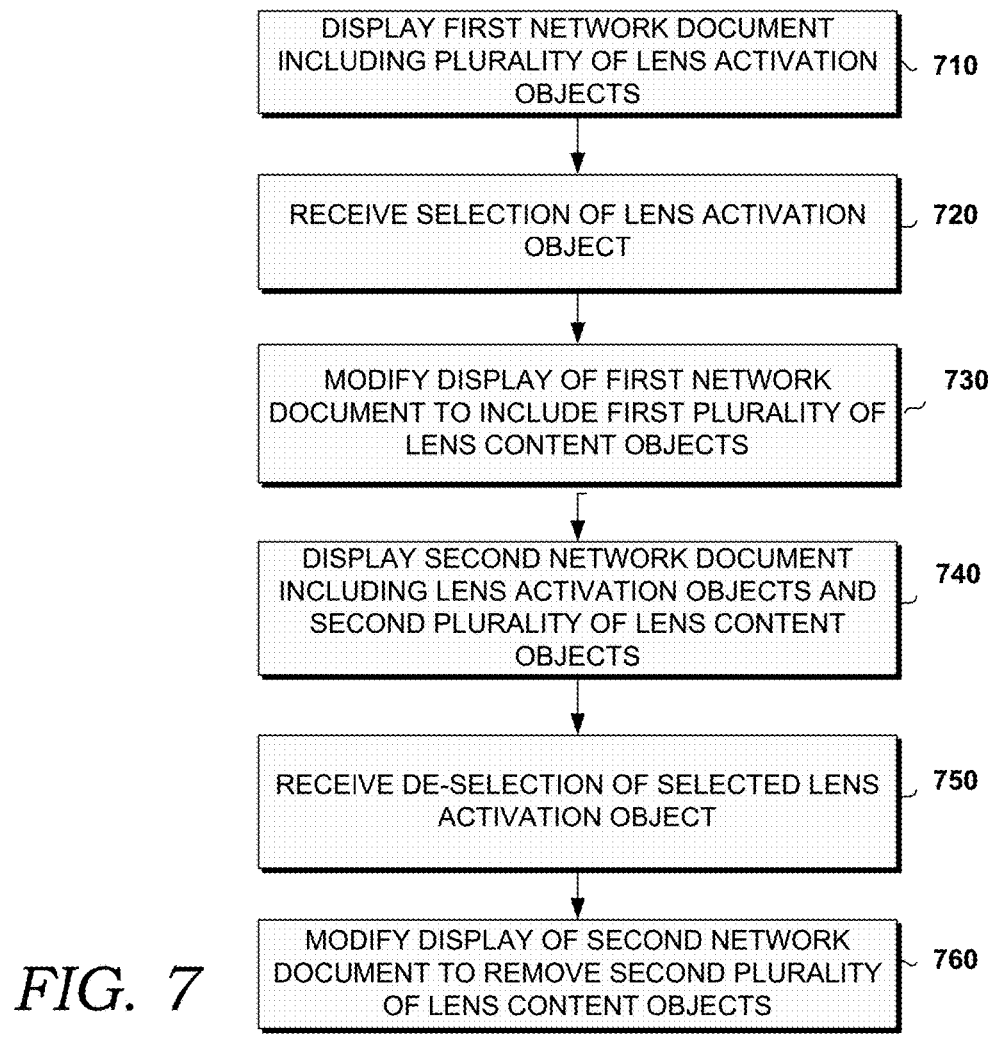
FIG. 7 provides an example of a method according to an embodiment of the invention.

FIG. 7 provides an example of a method according to an embodiment of the invention. In the embodiment shown in FIG. 7, a first network document is displayed 710. Display of the network document includes display of a plurality of lens activation objects. A selection of one of the displayed lens activation objects is then received 720. This activates the lens corresponding to the selected lens activation object. Based on this activation, the display of the first network document is modified 730 to include a first plurality of lens content objects. Preferably, the lens content objects are associated with the activated lens. A second network document is then displayed 740. The second network document can be displayed, for example, due to a request by a user for display of another document from the network site. The display 740 of the second network document includes display of the plurality of network activation objects. Preferably, the display of the previously selected lens activation object includes an indication that the lens is active. For example, the previously selected lens activation object can be shown in a different color, or with a different transparency, or any other convenient display method can be used to show activation. The display of the second document also includes display of a second plurality of lens content objects that are associated with the active lens. Because a second document is being displayed, the second plurality of lens content objects is different from the first plurality. A de-selection of the selected lens activation object is then received 750. This ends activation of the lens. As a result, the display of the second network document is modified 760 to remove the second plurality of lens content objects. Note that the initial display of the second network document included display of the second plurality of lens content objects. The selection of another document by a user does not change the activation status of a lens activation object. Thus, display of additional document that have content lenses will result in the content display objects associated with the lenses being displayed with the initial display of the document.

Figure 8:
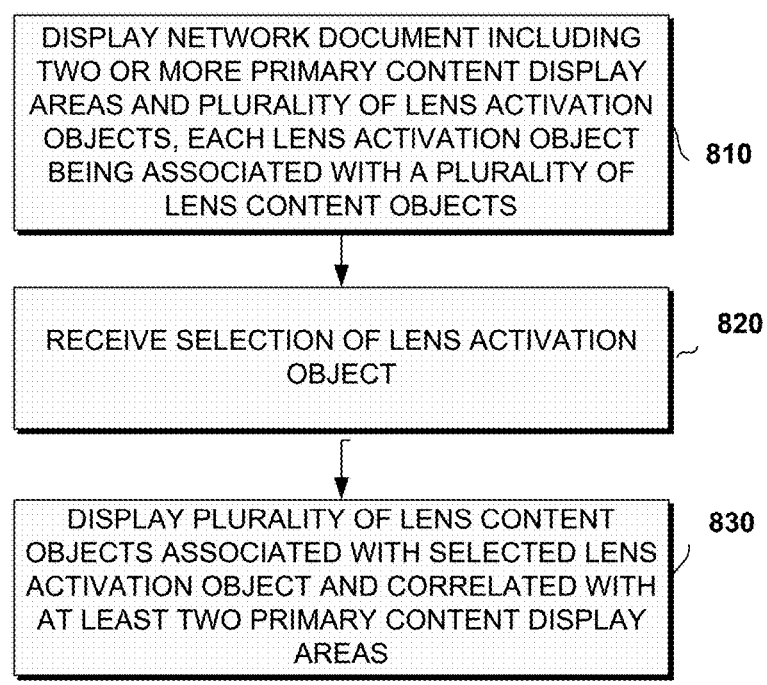
FIG. 8 provides another example of a method according to an embodiment of the invention.

FIG. 8 provides an example of a method according to another embodiment of the invention. In FIG. 8, a network document is displayed 810. The display of the network document includes display of two or more primary content display areas. The display of the network document also includes display of a plurality of lens activation objects. Each of the lens activation objects is associated with a plurality of lens content objects. A selection of a lens activation object is then received 820. This activates the corresponding content lens. As a result, the plurality of lens content objects associated with the lens activation object are displayed 830. The displayed plurality of lens content objects are correlated with at least two of displayed primary content display areas. Preferably, lens content objects that are associated with non-selected lens activation objects remain undisplayed. In such an embodiment, lens content objects associated with inactive content lenses are not made visible during display of the network document.

Figure 9:
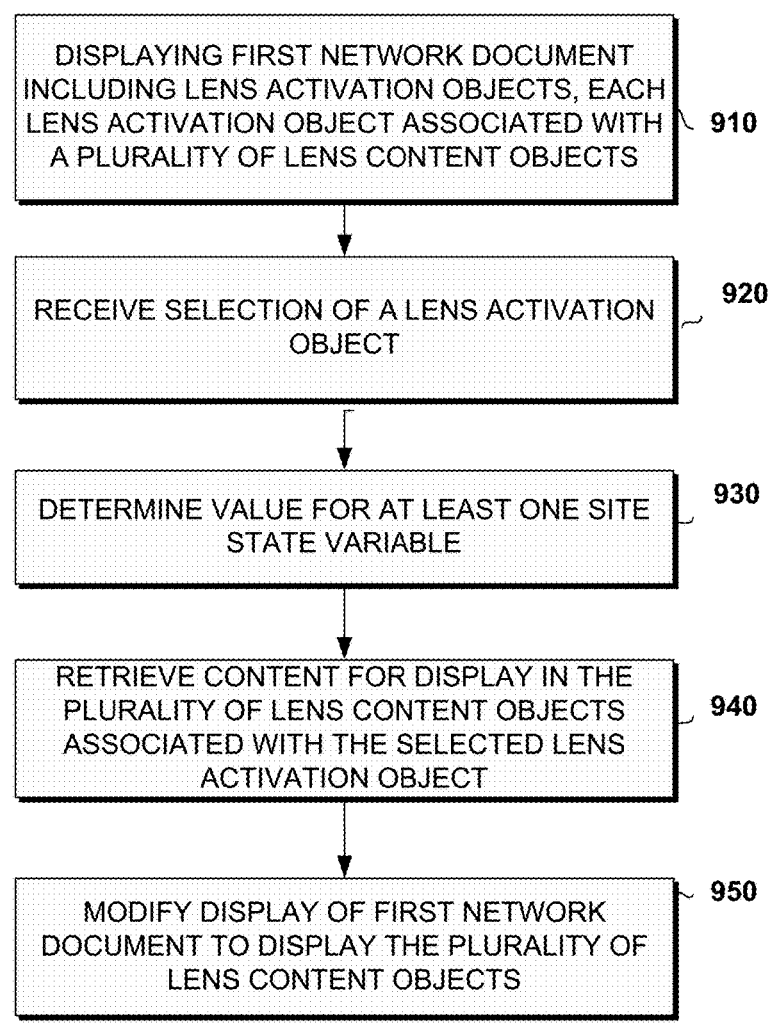
FIG. 9 provides another example of a method according to an embodiment of the invention.

FIG. 9 depicts a method according to still another embodiment of the invention. In FIG. 9, a first network document is displayed 910. The display of the first network document includes display of a plurality of lens activation objects. Preferably, each lens activation object is associated with a plurality of lens content objects. A selection of a lens activation object is received 920. This activates the corresponding content lens. Responsive to the selection of the lens activation object, the value of at least one site state variable is determined 930. Determining the value of the site state variable can refer to checking the stored value of the variable, or determining the value can refer to identifying raw data that is manipulated to determine a value. Content is then retrieved 940 for a plurality of lens content objects associated with the selected lens activation object based in part on the values of the determined site state variables. After retrieving 940 the content for the lens content objects, the display of the first network document is modified 950 to display the lens content objects.

Many different arrangements of the various components depicted, as well as components not shown, are possible without departing from the scope of the claims below. Embodiments of our technology have been described with the intent to be illustrative rather than restrictive. Alternative embodiments will become apparent readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims.

The invention claimed is:

1. A computer apparatus to facilitate using content lenses to display content in a network document, the apparatus comprising:
   computer-executable instructions configured, when executed by a computer system, to direct the computer system to:
   display a first network document comprising primary display content and a plurality of lens activation objects,
   receive a selection of a lens activation object,
   modify the display of the first network document to include a first plurality of lens content objects,
   retrieve first content for display in the first plurality of lens content objects based in part on a first value of a site state variable that is associated with the first content,
   display a second network document comprising the plurality of lens activation objects and a second plurality of lens content objects different from the first plurality of lens content objects,
   retrieve second content for display in the second plurality of lens content objects based in part on a second value of the site state variable that is associated with the second content,
   receive a de-selection of the selected lens activation object, and
   modify the display of the second network document to remove the second plurality of lens content objects but maintain space created for accommodating display of the second plurality of lens content objects; and
   at least one non-transitory computer-readable storage medium storing the computer-executable instructions.

2. The computer apparatus of claim 1, wherein the computer-executable instructions, to direct the computer system to modify the display of the first network document to include a first plurality of lens content objects, direct the computer system to move the primary display content to create space for accommodating the display of the plurality of lens content objects.

3. The computer apparatus of claim 1, wherein the computer-executable instructions, to direct the computer system to modify the display of the second network document to remove the second plurality of lens content objects, direct the computer system to remove space created for accommodating the display of the second plurality of lens content objects.

4. The computer apparatus of claim 1, wherein the first value and the second value of the site state variable are associated with a status of a user account for a site that provides the first network document and the second network document.

5. The computer apparatus of claim 1, wherein the first plurality of lens content objects are correlated with at least two primary content display areas.

6. The computer apparatus of claim 1, further comprising:
   the computer-executable instructions configured to direct the computer system to receive a selection of a second lens activation object, after selection of the first lens activation object but prior to de-selection, and
   display a third plurality of lens content objects.

7. The computer apparatus of claim 1, wherein content in the first network document comprises a plurality of primary content display areas, and wherein the computer-executable instructions, to direct the computer system to modify the display of the first network document to include the first plurality of lens content objects, direct the computer system to display the first plurality of lens content objects without obscuring content from the plurality of primary content display areas.

8. A method to facilitate using content lenses to display content in a network document, the method comprising:
   displaying a first network document comprising primary display content and a plurality of lens activation objects;
   receiving a selection of a lens activation object;
   modifying the display of the first network document to include a first plurality of lens content objects;
   retrieving first content for display in the first plurality of lens content objects based in part on a first value of a site state variable that is associated with the first content;
   displaying a second network document comprising the plurality of lens activation objects and a second plurality of lens content objects different from the first plurality of lens content objects;
   retrieving second content for display in the second plurality of lens content objects based in part on a second value of the site state variable that is associated with the second content;
   receiving a de-selection of the selected lens activation object; and
   modifying the display of the second network document to remove the second plurality of lens content objects but maintain space created for accommodating display of the second plurality of lens content objects.

9. The method of claim 8 wherein modifying the display of the first network document to include a first plurality of lens content objects comprises moving the primary display content to create space for accommodating the display of the plurality of lens content objects.

10. The method of claim 8 wherein modifying the display of the second network document to remove the second plurality of lens content objects comprises removing space created for accommodating the display of the second plurality of lens content objects.

11. The method of claim 8 wherein the first value and the second value of the site state variable are associated with a status of a user account for a site that provides the first network document and the second network document.

12. The method of claim 8 wherein the first plurality of lens content objects are correlated with at least two primary content display areas.

13. The method of claim 8 further comprising:
  receiving a selection of a second lens activation object, after selection of the first lens activation object but prior to de-selection; and
  displaying a third plurality of lens content objects.

14. The method of claim 8 wherein content in the first network document comprises a plurality of primary content display areas, and wherein modifying the display of the first network document to include the first plurality of lens content objects comprises displaying the first plurality of lens content objects without obscuring content from the plurality of primary content display areas.

* * * * *